May 17, 1932. E. A. KELLY 1,859,041

DEPOSIT BOOK

Filed May 18, 1931

INVENTOR.
EDWARD A. KELLY.

BY
Lockwood Lockwood Goldsmith & Galt
ATTORNEYS.

Patented May 17, 1932 | 1,859,041

UNITED STATES PATENT OFFICE

EDWARD A. KELLY, OF INDIANAPOLIS, INDIANA

DEPOSIT BOOK

Application filed May 18, 1931. Serial No. 538,095.

This invention relates to so-called systematic deposit books suitable for use by banking institutions, and the like, in their so-called Christmas club, Vacation club or systematic savings departments.

The books of this general character heretofore, have been arranged so that for each deposit coupon there is provided an individual receipt form stub. When regular weekly deposits are made over an annual period for a purpose, such as vacations, Christmas purchases or the like, this type of book now in common use requires fifty deposit coupons and fifty receipt form stubs.

Should a deposit coupon be intentionally or accidentally detached, either by the receiving teller and not noted by him or by the depositor, the receiving teller might detach the next exposed coupon and stamp the stub as paid, thereby receipting for a total not the true total. In other words, where such receipt of total is a part of the stub, the teller in each instance to guard against such accidental or intentional loss or separation of a coupon, must and probably will examine the last two or three stubs ahead of the next stub that would be authenticated or receipted when the receiving teller detaches the coupon from the book presented by the depositor.

The present invention has for its object the elimination of this thumbing through the stubs so that the teller at a glance can verify the last total receipted, the next deposit to be made and the deposit coupon that should be presented for deposit at that time.

Another object of the invention is to reduce the size of such coupon books so that they will be no more than the so-called vest pocket size and thus convenient for carrying in a vest pocket or in a woman's purse. This size, however, must not be so small that the coupon is inconvenient for the bank to handle because of its small size, and a convenient size has been found to be about two and three-eighths inches by three inches. This has been found of sufficient size for binding in book form, also of sufficient size for a bank to conveniently handle the detached coupons, and also of not too large a size for vest pocket carrying or the like.

Another object of the invention is to permit the receiving teller to authenticate or receipt the multiple stub or multiple receipt form and the deposit coupon without turning any pages.

Another object of the invention is to reduce the handling time by the receiving teller and this is obtained by forming a plurality of receipt forms, each of which is of less length than the next lower receipt form, so that the receipt forms are automatically indexed when one or more has been completely filled.

Another object of the invention eliminates the possibility of unnecessary handling by arranging the coupons in groups and superposing on each group of coupons a receipt form for said group.

The aforesaid objects are accomplished by the present invention and the features thereof will be more specifically pointed out hereinafter in the detailed description of the construction and arrangement of the deposit book.

The full nature of the invention will be understood from the accompanying drawings and the following description and claims:

In the drawings, Fig. 1 is a perspective view of a deposit book embodying the invention, wherein but a part of the first group of coupons has been deposited and the receipt form has been authenticated relative thereto and there is simultaneously exposed, the receipt form and a portion of the next coupon to be deposited for authentication of both without page turning and verification of the proper deposit coupon relative to the next deposit to be made.

Figure 1:
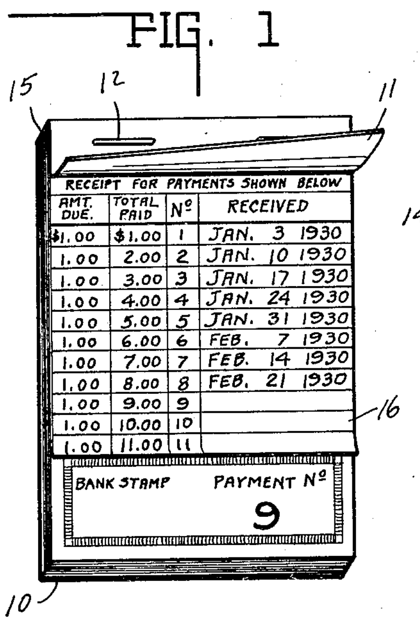

In the drawings, there is illustrated a back cover 10, a top cover 11, the same being associated together by stapling 12 and included therebetween is a plurality of superposed deposit coupons, each of substantially the same size and herein the body portion is indicated by the numeral 13 and the same has a partially perforated connection 14 with a smaller portion 15 that is secured with the other coupons in book form and by the staples 12. In addition to the stapling, a suitable binder, in common use on all coupon books at the present time, may also be employed. The outside of the back cover as well as the inside may contain suitable printing matter and the inside and outside of the front cover may also contain suitable printing matter. In general, it has been found desirable to print the rules of the systematic savings arrangement upon the exterior of the back cover and to print upon the face of the top cover, the book account number, the total final amount for which the book is to be employed and the unit payment, the receiving organization and the name and address of the depositor. This type of general arrangement of the printed matter upon the cover is likewise in general use upon deposit coupon books and forms no part of the invention, but is merely set forth herein to complete the description of the present book. The several coupons are arranged in groups and positioned between each group in superposed relation is a so-called receipt form sheet, the upper sheet being indicated by the numeral 16 and the successively lower receipt form sheets by the numerals 17, 18 and 19.

In making up a book to cover an annual period for unit weekly payments, it has been found desirable to have the payments run over a period of fifty weeks and a convenient number of receipt forms that may be employed therewith has been found to be four. This number may be increased to five when a much smaller size coupon is employed and if a larger size coupon is employed, the number of receipt forms may be reduced to three or even two but such reduction, as will be apparent from the description set forth hereinafter, requires that the coupon book be of a size larger than that previously set forth as being found the most convenient size.

Each receipt form preferably includes, upon its face, a number of areas equal to the number of deposit coupons with which the receipt form is specifically associated. As shown in Fig. 1, the receipt form 16 is provided with eleven spaces numbered from one to eleven and each coupon therebeneath is progressively numbered from one to eleven. The receipt form terminates short of the free end of the deposit coupon so that the face of the receipt form and the lower or free end portion of the uppermost nondetached coupon are simultaneously exposed. As shown in Fig. 1, it is evident that eight deposits have been made and that the next deposit will be the ninth and the correct deposit coupon number 9 should be exposed so that the receiving teller can instantly check by eye the next deposit number with the next deposit coupon which should correspond.

Another advantage obtained by the aforesaid is that the authentication or receipting of the coupon may be made by the receiving teller without moving the receipt form or the coupon, and the teller may authenticate the coupon and the receipt form in two successive operations without any page turning, thereby eliminating the possibility of the teller authenticating either the wrong receipt form area that should be authenticated or the wrong coupon.

Each receipt form also contains in addition to the number of the payment, the amount due for each payment and the total payment as well. Any type of receipt authentication may be employed. Herein merely a plain dating is illustrated in order to show the employment of the book.

Figure 2:
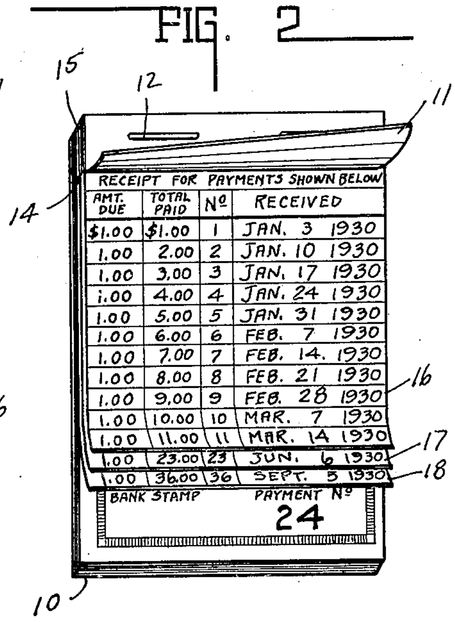
Fig. 2 is a similar view of a deposit coupon book, wherein the third receipt form is exposed preliminary to authentication and verification when the first coupon of the third group is to be presented for detachment and deposit.
Figure 3:
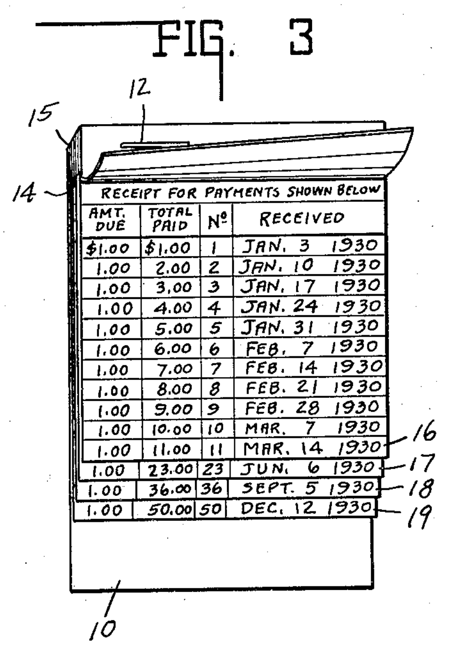
Fig. 3 is a similar view of the book with all of the coupons detached and the receipt forms only remaining.
Figure 4:
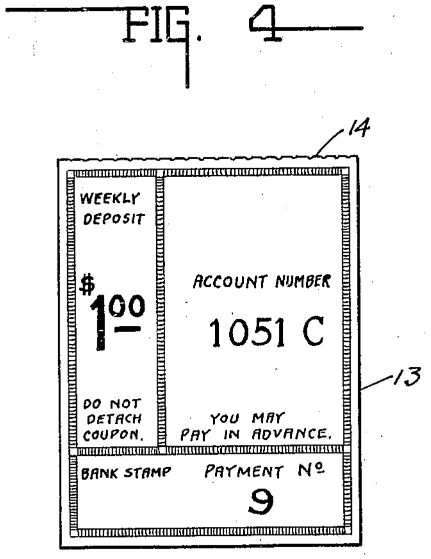
Fig. 4 is a front view of a suitable type of deposit coupon showing the same detached from the book.

The coupon includes not only the payment number and the amount of the deposit evidenced by said coupon, the verification or receipt thereon, but also the account number so that the coupons as received may be filed by the banking institution. The individual making the deposit, of course, keeps the book while the savings institution keeps the coupons as they are detached and receipted for. As suggested hereinbefore, a plurality of receipt forms is associated with a like number of groups of superposed coupons. In Fig. 2 the operation of the book has been carried to the point where three receipt forms have been exposed by the successive detachment of two superposed groups of coupons and it will be apparent that the third receipt form will expose at the top of its page payment #24 for receipt or authentication and exposed therebeneath is the coupon numbered twenty-four.

To facilitate the exposure of the immediate superposed receipt form associated with the coupon to be next detached and the authentication and verification of both, the successive receipt forms are shown of progressively increasing length, each lower receipt form being of slightly greater length than the immediate superposed receipt form so that the receiving teller need only place his forefinger on lowest edge of the last receipt form exposed and flip up the others to position the proper receipt form to receive the authentication and the lower portion of the deposit coupon so that the book then is in substantially the same condition as the book is as shown in Fig. 1. In this instance, receipt forms 16 and 17—see Fig. 2—will be turned back by the receiving teller with the top cover and the receiving teller will note that receipt form 18 has its first authenticated space numbered twenty-four and that the same corresponds with the deposit coupon exposed. The bank's stamp space or verification space of the coupon is exposed and the receipt form space for verification is exposed, so that the teller then can authenticate both without subsequent paging and if desired, by the same authenticating instrument, such as the date stamp or initial stamp or the combination thereof and preferably the latter.

When all of the deposits have been made and all of the coupons have been detached, the last authentication will be made upon the last space upon receipt form 19 and there will remain in the coupon book no further deposit coupons. The depositor has then paid up the book and if the rules of the savigns organization so provide, may demand the full payment that the face value of the book calls for. Usually the savings institution agrees to pay the book upon a given date and usually the amount paid, upon surrender of the full paid book, may be slightly in excess of the actual payments made, the same possibly representing interest or the incentive for a systematic saving.

The depositor when receiving the full face value of the book surrenders the book and the bank may then destroy all accumulated coupons and the book which has been turned in. The bank may also run a ledger sheet for each account and the posting tellers may post thereon each coupon as deposited and the bank in this instance will probably only retain the last coupon and destroy each preceding coupon upon the deposit of the next succeeding one, thus reducing the required file space of the saving institution.

The inside of the back cover of the book may also have printed on it a general form of receipt for the full amount of the face value of the book which the depositor may be required to sign when receiving payment for the face value of the book upon surrender thereof.

It has been found desirable when a fifty unit payment over an annual period is to be employed that the first receipt form contain but eleven authentication spaces, the second twelve, the third thirteen and the last fourteen, and these are numbered respectively from one to eleven, inclusive, twelve to twenty-three inclusive, twenty-four to thirty-six inclusive, and thirty-seven to fifty inclusive, respectively.

A book of this character need not, of course, be limited to fifty payments but may be limited to twenty-five payments; for example, a savings club payable weekly over a semi-annual period for Christmas present purchasers or a similar book for vacation purposes. In that event, twenty-five weekly payments might be employed and two receipt forms, one of twelve and the other of thirteen authentication areas would be employed therewith.

This invention may also be incorporated in a book representing regular weekly payments over a period of eighteen months or two years, such as for the financing of auto mobiles, phonographs, radios, and the like, wherein each payment is made monthly, and the number of receipt forms may be one, two or three, as found desirable, depending upon the number of groups that are included in each book. It has been found desirable to limit the number of receipt form authentication spaces per receipt form sheet to not more than fifteen, because the size of the sheet then becomes larger than that convenient for vest pocket carrying.

Although not shown in the drawings, it is contemplated that for different unit payments, different colored coupons will be employed. Thus, a twenty-five-dollar club may have a green coupon, each deposit representing about fifty-cents; a fifty-dollar club would have a yellow coupon, each deposit coupon representing one-dollar, and so on for fifty and one hundred dollars and similar amounts.

Although not shown in the drawings, the receipt forms are of a different color than the coupons so as to be readily visually distinguishable. The covers of the books also may be made of different colors for books representing different club amounts.

The invention claimed is:—

1. A vest pocket size, multiple deposit book including a plurality of substantially similar deposit coupons arranged in groups, a receipt form for each group of coupons, the receipt form being positioned above the associated coupons, and all receipt forms being of progressively increasing length from top to bottom of the book and with the last receipt form of shorter length than the coupons for the purpose set forth.

2. A vest pocket size, multiple deposit book including a plurality of substantially similar deposit coupons arranged in groups, a receipt form for each group of coupons, the receipt form being positioned above the associated coupons, and all receipt forms being of progressively increasing length from top to bottom of the book and with the last receipt form of shorter length than the coupons for the purpose set forth, each superposed receipt form being of less length than the next lower receipt form for ready indexing of the receipt forms.

3. A vest pocket size, multiple deposit book including a plurality of substantially similar deposit coupons and arranged in groups, a receipt form for each group of coupons, the receipt form being positioned above the associated coupons, and all receipt forms being of progressively increasing length from top to bottom of the book and with the last receipt form of shorter length than the coupons for the purpose set forth, each receipt form including a number of appropriately designated receipt spaces equal to the number of deposit coupons positioned immediately therebeneath, each successive space and deposit coupon being similarly numbered for ready verification and receipt form entry.

4. A vest pocket size multiple deposit book including a plurality of substantially similar superposed individual deposit coupons arranged in groups, a receipt form for each group of individual superposed coupons, the receipt form being positioned above the associated coupons, and all receipt forms being of less length than the deposit coupons for permitting constant and instantaneous receipt form and coupon authentication without page turning.

5. A vest pocket size multiple deposit book including a plurality of substantially similar deposit coupons arranged in groups, a receipt form for each group of coupons, the receipt form being positioned above the associated coupons, and all receipt forms being of less length than the deposit coupons permitting receipt form and coupon authentication without page turning, each superposed receipt form being of less length than the next lower receipt form for ready indexing of the receipt forms.

6. A vest pocket size multiple deposit book including a plurality of substantially similar superposed individual deposit coupons arranged in groups, a receipt form for each group of individual superposed coupons, the receipt form being positioned above the associated coupons, and all receipt forms being of less length than the deposit coupons permitting receipt form and coupon authentication without page turning, each receipt form including a number of receipt spaces equal to the number of appropriately designated deposit coupons positioned immediately therebeneath, each successive space and deposit coupon being similarly numbered for ready verification and receipt form entry.

7. A coupon book suitable for regular and periodic payments over a substantially long period, including a sufficient number of deposit coupons arranged in a plurality of and at least three superposed groups, a multiple receipt form between adjacent groups and superposed above the first group, each superposed group including less coupons than the next lower group, and each superposed receipt form being of less length than the next lower form and all forms being of less length than the coupons therebeneath for the purpose set forth.

In witness whereof, I have hereunto affixed my signature.

EDWARD A. KELLY.